US006945921B2

(12) United States Patent
Sirejacob

(10) Patent No.: US 6,945,921 B2
(45) Date of Patent: Sep. 20, 2005

(54) ROLLER FOR A PRINTER, FAX MACHINE OR COPIER

(75) Inventor: Gino Sirejacob, Evergem (BE)

(73) Assignee: ICT Coatings N.V., Deinze (BE)

( * ) Notice: Subject to any disclaimer, the term of this patent is extended or adjusted under 35 U.S.C. 154(b) by 250 days.

(21) Appl. No.: 10/150,502

(22) Filed: May 16, 2002

(65) Prior Publication Data

US 2003/0216234 A1 Nov. 20, 2003

(51) Int. Cl.[7] .................................................. F16C 13/00
(52) U.S. Cl. ............................................ 492/56; 492/59
(58) Field of Search ..................... 492/56, 59; 399/115, 399/116, 122; 428/335

(56) References Cited

U.S. PATENT DOCUMENTS

| | | | | |
|---|---|---|---|---|
| 5,364,697 A | * 11/1994 | Miyabayashi | ............... | 428/323 |
| 5,697,027 A | 12/1997 | Takagi et al. | ............... | 399/279 |
| 6,004,669 A | * 12/1999 | Rokutan et al. | ............ | 428/335 |
| 6,013,201 A | * 1/2000 | Hayashida et al. | ......... | 252/511 |
| 6,454,688 B1 | * 9/2002 | Okuda et al. | ................. | 492/56 |
| 6,703,094 B2 | * 3/2004 | Kakii et al. | .............. | 428/36.91 |
| 2002/0028096 A1 | 3/2002 | Satoh et al. | | |
| 2002/0034395 A1 | * 3/2002 | Ohuchi et al. | ................ | 399/52 |

FOREIGN PATENT DOCUMENTS

| | | | |
|---|---|---|---|
| JP | 7-53860 | * | 2/1995 |
| JP | 09 296072 A1 | | 11/1997 |
| JP | 2001221225 A | * | 8/2001 |

OTHER PUBLICATIONS

Patent Abstracts of Japan, vol. 1997, No. 3, Mar. 3, 1997, JP 08 286517 filed Nov. 1, 1996.

Patent Abstracts of Japan, vol. 013, No. 342, Aug. 2, 1989, JP 01 102485 filed Apr. 20, 1989.

Patent Abstracts of Japan, vol. 1998, No. 09, Jul. 31, 1998, JP 10 110100 filed Apr. 28, 1998.

Patent Abstracts of Japan, vol. 1995, No.: 07, Aug. 31, 1995, JP 07 102115 filed Apr. 18, 1995.

Gino Sirejacob, "A Process for Coating a Siliceous Substrate With a Silicon Containing Layer", U.S. Appl. No. 09/843, 618, filed Apr. 26, 2001.

* cited by examiner

*Primary Examiner*—Marc Jimenez
(74) *Attorney, Agent, or Firm*—Darby & Darby

(57) ABSTRACT

A roller intended to be in contact with toner particles is provided with a cured resin layer having homogeneously dispersed carbon black aggregates and having a thickness of less than 200 $\mu$m, whereby the carbon black aggregates have a weight average size lower than 30 $\mu$m, a DPB absorption of more than 110 ml/100 g, a BET-surface area greater than 250 $m^2$/g, and coated with an amino silane compound.

20 Claims, 1 Drawing Sheet

ROLLER FOR A PRINTER, FAX MACHINE OR COPIER

FIELD OF THE INVENTION

The invention relates to a roller, such as a magnetic drum or a PCR (primary charge roller) or a developing roller provided with a coating containing carbon black particles. Especially, the invention relates to a process enabling the recoating of used magnetic drum or PCR, i.e. the recycling thereof. The roller can also be a new one which have to be provided with an electric conductive layer.

THE PRIOR ART

Developer rollers have been provided with electrically conductive coating.

Many patents or patent applications discloses electrically conductive coatings applied on developing rollers.

For example, U.S. Pat. No. 5,697,027 discloses a developing roller comprising an elastic layer coated with a conductive layer containing carbon black having an oil absorption of up to 80 ml/100 g and a specific area of up to 150 $m^2/g$. The elastic layer is made of nylon copolymer, phenolic resin, urethane resin, silicon resin, melamin resin+alkyd resin, fluorocarbon resin. As shown in the comparative example of said patent, when using carbon black particles having an oil absorption of 125 mil/100 g, the coating was not homogeneous, as minor variations of resistance were observed.

Tests made by Applicant have shown that when coating a developer roller with a suspension of carbon black aggregates (with an oil absorption of more than 100 ml/100 g and with a BET surface area of more than 150 $m^2/g$) in a polysiloxane solution, the layer had after curing a poor adherence especially near its free edges, such a poor adherence causing a delamination or peeling of the layer after a few copies.

Other tests made by Applicant have shown that when coating an aluminum roller, as well as a cylinder provided with a graphite layer, with a suspension of carbon black aggregates (with an oil absorption of more than 100 ml/100 g and with a BET surface area of more than 150 $m^2/g$) in a polysiloxane solution, no adhesion of the carbon black layer could be achieved, whereby the peeling of said carbon black layer was easy. Furthermore, said non adhering layer was not uniform.

Amino silanes, such as Silquest® silanes, are known as extremely versatile products that can react with a wide variety of organic and inorganic materials These compounds are known as being coupling agents in various applications. Amino silanes are considered as having no silane effectiveness for carbon black, whereby the man skilled in the art would be discourage to use such an amino silane for treating carbon black particles.

It has now been observed that it was possible to solve the problem of using carbon black particles with a high oil absorption and a high BET surface area in conductive layer, by coating said carbon black aggregates with an amino silane compound known as having no silane effectiveness for carbon black, and by mixing said coated carbon black aggregates with a polysiloxane solution.

By using such carbon black aggregates in a polysiloxane layer, it is possible to ensure that the layer has an extremely high electrical conductiveness, while having a good adherence to the substrate. Other properties of the roller of the invention will appear from the following description.

BRIEF DESCRIPTION OF THE INVENTION

The invention relates to a roller for a printer, fax machine or copier, said roller being intended to be in contact with toner particles, said roller being provided with at least one carbon black containing resin layer, said resin layer being a cured resin layer having a thickness of less than 500 μm, advantageously less than 200 μm, preferably less than 100 μm, more preferably less than 50 μm, especially less than 20 μm.

- in which the carbon black has the form of aggregates of carbon black particles, said aggregates having a weight average size lower than 30 μm, a DBP absorption of more than 110 ml/100 g, for example about 120 ml/100 g, 200 ml/100 g, 400 ml/100 g, and a BET-surface area greater than 250 $m^2/g$, such as 300 $m^2/g$, 500 $m^2/g$, 750 $m^2/g$, 1000 $m^2/g$ or even more,
- in which the carbon black aggregates are coated at least partly with an amino silane compound, and
- in which the carbon black aggregates at least partly coated with an amino silane compound are substantially homogeneously dispersed in the cured resin.

The carbon black aggregate containing cured layer has advantageously the following properties: wear resistance, abrasion resistance, flexibility, anti staining properties. The electrical conductivity can vary from a conductive layer to electrical resistance layer in function of the requirement.

According to a detail of preferred embodiment, the weight ratio amino silane/carbon black aggregate is comprised between 0.01 and 1, advantageously between 0.05 and 0.95, preferably between 0.2 and 0.8, preferably about 0.5.

According to an advantageous embodiment, the amino silane is an amino silane in which the silicon atom is bound to three groups selected from the group consisting of methoxy, ethoxy, propoxy and butoxy. For example, the amino silane is selected from the group consisting of amino (C2–C12 alkyl) trimethoxysilane, amino (C2–C12 alkyl) triethoxysilane and their mixtures. Advantageously, the amino silane is selected from the group consisting of amino (C3–C6 alkyl) trimethoxysilane, amino (C3–C6 alkyl) triethoxysilane and their mixtures. Preferred amino silanes are amino silanes having a water solubility at pH higher than 7, such as a solubility of at least 3% in water with a pH higher than 7. Preferably, the amino silane is selected from the group consisting of amino propyl trimethoxysilane, amino propyl triethoxysilane and their mixtures.

According to preferred embodiments, the cured resin layer can comprise from 1% by weight up to 99% by weight of carbon black aggregates coated with an amino silane. However, advantageously the cured resin comprises more than 40% by weight of carbon black aggregates coated with an aminosilane, advantageously more than 50% by weight of carbon black aggregates coated with an amninosilane.

The resin layer is advantageously a layer made of a resin selected from the group consisting of polyurethane, natural rubber, butyl rubber, nitrile rubber, polyisoprene rubber, polybutadiene rubber, silicone rubber, styrene butadiene rubber, acryl rubber, polysiloxane,epoxy and mixtures thereof. Preferably, the resin layer comprises at least one curable polysiloxane. More preferably, the resin layer is a cured polysiloxane layer.

As polysiloxane, the polysiloxane is advantageously selected from the group consisting of methyl polysiloxane, methyl phenyl polysiloxane, phenyl polysiloxane and their mixtures.

The carbon black containing cured resin (preferably polysiloxane) layer overcoats advantageously a layer selected from the group consisting of aluminum containing layer, carbon black containing layer, polyurethane containing layer, silicon containing layer, epoxy containing layer and graphite containing layer, for example a layer of a roller to be recycled.

According to possible embodiments, the cured polysiloxane layer may contain further solid particles, preferably particles with a high abrasion resistance or a high hardness, such as a Mohs hardness higher than 4, advantageously higher than 5. As example of solid particles, substantially spherical beads with a weight average particle size lower than 50 μm are preferred. Most preferably said substantially spherical beads have a particle size lower than 20 μm, such as lower than 10 μm, or even less.

The substantially spherical beads are advantageously electrical conductive. For example, the beads are formed of a conductive material. However preferably, the beads are provided with an electrical conductive coating or layer.

The cured resin (preferably polysiloxane) layer can if required be overcoated with one or more further layers, such as silicon containing layer, etc. When overcoating the roller with a layer comprising amino silane and polysiloxane, said layer comprising no electrical conductive additive for reducing the surface electrical resistance to less than $10^5$ Ω.cm, it was possible to obtain an uniform amino silane—polysiloxane layer having the following properties, surface electrical resistance of more than $10^5$ Ω.cm, preferably of more than $10^7$ Ω.cm such as $10^7$ Ω.cm to $10^{12}$ Ω.cm; wear resistance, abrasion resistance, anti staining properties, antistatic properties. The thickness of said coating is advantageously lower than 100 μm, for example lower than 50 μm, preferably lower than 20 μm, such as 10 μm, 5 μm, etc.

It has also been observed that such an aminosilane—polysiloxane layer can be applied on other supports, such as rollers, plates, particles, etc, for providing the following properties to the face of said support covered with said layer: wear resistance, abrasion resistance, anti staining properties, antistatic properties.

Such an antistatic layer may comprise particles with a high hardness, such as a Mohs hardness of more than 4, preferably of more than 5, said particles having preferably a substantially spherical shape, such as glass beads, etc.

Such an antistatic layer is for example made from a solution in which the amino silane and the polysiloxane are solubilized. The weight ratio amino silane/polysiloxane can vary in function of the requirement, and is for example comprised between 0.01 and about 1, advantageously between 0.02 and 0.5.

As specific examples of roller, the following can be mentioned: developing rollers, magnetic rollers and primary charge rollers.

The invention relates also to a process for providing a cylindrical face of a roller of a printer, a fax machine or a copier intended to contact toner particles, with a carbon black containing curable resin (preferably polysiloxane) layer, in which

- the cylindrical face of the roller is washed and dried;
- carbon black aggregates having a weight average size lower than 30 μm a DBP absorption of more than 110 ml/100 g, for example about 120 ml/100 g, 200 ml/100 g, 400 ml/ 100 g, and a BET-surface area greater than 80 $m^2$/g, such as greater than 100 $m^2$/g, advantageously greater than 250 $m^2$/g, such as 300 $m^2$/g, 500 $m^2$/g, 750 $m^2$/g, 1000 $m^2$/g or even more are mixed with an amino silane containing solution, so as to coat at least partly said carbon black aggregate with amino silane;
- the coated carbon black aggregates are mixed with a solution containing at least one curable resin so as to form a homogeneous suspension of coated carbon black aggregates in the curable resin solution;
- said washed and dried face of the roller is coated with a quantity of said homogeneous suspension for forming a carbon black containing curable resin layer, and
- the curable resin layer (coating the roller) is cured, whereby the amount of homogeneous suspension (coating the roller) is adapted for obtaining a cured polysiloxane layer with a thickness lower than 200 μm, preferably lower than 100 μm, most preferably lower than 50 μm, such as less than 20 μm, for example 15 μm, 10 μm, 5 μm.

The resin used is advantageously a resin as disclosed for the roller of the invention.

The washing step can be made with a composition containing at least a biocide or can be made after a prior biocide treatment as-taught in U.S. Ser. No. 09/843.618, the content of which is incorporated by reference.

Advantageously, the carbon black aggregates are mixed with a substantially water free amino silane containing solution for coating said aggregates with amino silane.

Preferably, the carbon black aggregates is mixed with a mixture consisting of a solvent (advantageously an organic solvent, such as an alcohol, preferably ethanol possibly mixed with methanol) and one or more amino silanes. According to a possible embodiment, the carbon black aggregates are first pretreated with the organic solvent so as to remove any possible water present in the carbon black aggregates, and then treated with the amino silane solution.

According to an embodiment, the carbon black aggregates are mixed with an amino silane containing alcohol solution so as to form an alcohol suspension of coated carbon black aggregates, and in which said suspension is mixed with a water free solution containing resin (preferably polysiloxane), so as to form a homogeneous carbon black aggregate containing suspension.

According to a specific embodiment, the amino silane is an amino silane having a sufficient water solubility so as to prepare an aqueous amino silane solution containing more than 1% by weight advantageously more than 3% by weight (such as about 5% by weight) amino silane at pH 7, while the curable resin is a resin having a sufficient water solubility so as to prepare an aqueous amino silane/resin solution. In such a case an aqueous solution is used for coating the roller.

The curing of the resin (preferably polysiloxane) layer is made at a temperature sufficient for initiating the curing, for example at a temperature higher than 10° C., advantageously higher than 20° C., preferably higher than 50° C., such as a temperature higher than 80° C. advantageously at a temperature higher than 100° C., said curing being made so as to avoid the degradation of cured resin (preferably polysiloxane) with amino silane binds.

The process is advantageously controlled or adapted so as to produce a roller of the invention having one or more characteristics as disclosed hereabove.

DESCRIPTION OF THE PREFERRED EXAMPLES

Example 1

A polysiloxane suspension has been prepared as follows.

Carbon black aggregates having a DBP absorption of 120 ml/100 g (calculated as powder or beads), a BET-surface area of about 265 $m^2/g$, a aggregate average size of less than about 20 $\mu$m, (the aggregates being formed by the aggregation of primary particles with an average size of about 18 nanometer) have been mixed with pure ethanol. Thereafter an ethanol solution containing aminopropyltriethoxysilane was added to the ethanol solution containing the carbon black aggregates. After mixing the two solutions, a stable alcohol suspension was prepared, said suspension having the following composition:

20% by weight of carbon black aggregates;

10% by weight of amino silane, and

70% by weight of ethanol.

The mixing was made at room temperature (20° C.).

One part by weight of a polysiloxane solution containing 16% by weight of polysiloxane (propyl trimethoxy silane) and an organic solvent (ethanol) was mixed with one pail by weight of the carbon black suspension, so that the suspension contains about 15% by weight of coated carbon black aggregate+aminosilane, and about 8% by weight of polysiloxane.

Said suspension was used for coating an aluminum cylinder 1. Such a coating was made by dipping the cylinder into the suspension. After removing the drum, it was observed that a perfect wetting of the cylinder with the coating suspension was obtained. Thereafter, the cylinder was submitted to a heat treatment by means of hot air with a temperature of about 150° C. Said treatment enables the evaporation of the organic solvent (ethanol), as well as the curing of the polysiloxane. A complete curing was obtained after 5 minutes treatment. The length of the treatment can be adapted as required. The minimum required time for obtaining the fall curing at a specific temperature can be determined by simple tests.

Figure 1:
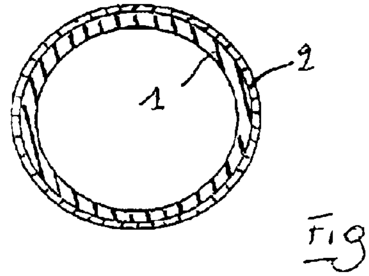
FIG. 1 is a cross section view of a first embodiment of a roller according to the invention.

The cylinder 1 was thus provided with an electrically conductive polysiloxane layer 2 (see FIG. 1), containing about 60% by weight of carbon black aggregates coated with aminosilane (i.e. about 40% by weight of carbon black aggregates without the amino silane coating). The thickness of the polysiloxane layer was of about 10 $\mu$m. Said layer was uniform and has anti staining properties.

The electrical resistance of the conductive polysiloxane layer 2 (having a black color) was lower than $10^2$ Ω.cm, even lower than 10 Ω.cm.

The adherence of the layer 2 on the aluminum drum was excellent. Said layer had homogeneous properties and no surface defects could be observed.

As the layer had excellent abrasion resistance properties, the drum could be used in a printer as magnetic roller (after placement of a magnetic core 3 into the inner chamber of the drum 1). After making a few 10 thousands copies, the copies were still of excellent quality and it was still not necessary to replace the magnetic drum or to retreat the magnetic drum.

EXAMPLE 2

A magnetic cylinder comprising a cylinder 1 (for example an aluminum cylinder) coated with at least a carbon black containing layer 3 has to be recycled after a few thousands copies, said recycling is necessary as the properties of the layer 3 are no more homogeneous.

For said recycling, the layer 3 has been submitted to the following treatments:

- the layer 3 has been submitted to a washing with an aqueous solution containing some surfactants and copper ions (as biocide), the washed layer has then been treated with clean water so as to remove any trace of surfactants, and finally the layer 3 was dried by means of hot air (temperature of 50–80° C.);
- a layer 2 was then applied on the layer 3 in the same way as explained for example 1.

Figure 2:
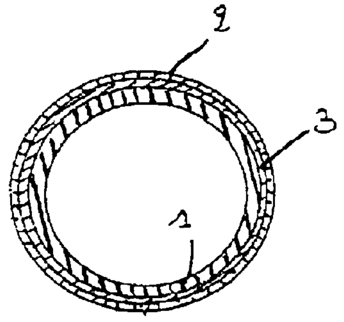
FIG. 2 is a cross section view of another embodiment of the invention.

(see FIG. 2 showing the final product)

EXAMPLE 3

Example 2 has been repeated, except that the layer 2 was overcoated with a non conductive amino silane-polysiloxane layer 4 not containing no carbon black. It was observed that the wetting of the amino silane-polysiloxane layer 2 with the non conductive polysiloxane solution was excellent. The layer 4 had the following properties: flexible; wear and abrasion resistance, antistatic properties.

Figure 3:
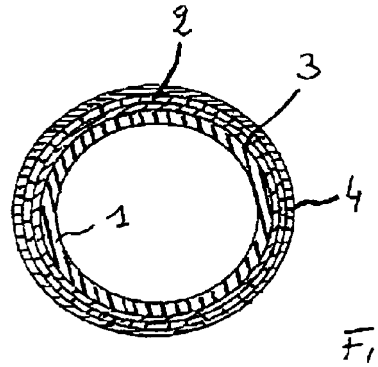
FIG. 3 is a cross section view of a further embodiment of the invention.

(see FIG. 3)

EXAMPLES 4 to 6

Examples 1 to 3 have been repeated, except that Carbon black aggregates having a DBP absorption of 400 ml/100 g (calculated as beads), a BET-surface area of about 1000 $m^2/g$, an aggregate average size of less than about 20 $\mu$m, (the aggregates being formed by the aggregation of primary particles with an average size of about 35 nanometers) have been used.

EXAMPLES 7 to 9

Examples 1 to 3 have been repeated, except that a mixture containing 50% by weight Carbon black aggregates having a DBP absorption of 120 ml/100 g (calculated as powder or beads), a BET-surface area of about 265 $m^2/g$, a aggregate average size of less than about 20 $\mu$m, (the aggregates being formed by the aggregation of primary particles with an average size of about 18 nanometer), and 50% by weight Carbon black aggregates having a DPB absorption of about 115 ml/100 g (calculated as powder or beads), a BET-surface area of about 150 $m^2/g$, a aggregate average size of less than about 20 $\mu$m, (the aggregates being formed by the aggregation of primary particles with an average size of about 23 nanometer) has been used.

EXAMPLES 10 to 18

Examples 1 to 9 have been repeated, except that another amino silane, namely amino propyl trimethoxy silane, has been used.

EXAMPLES 19 to 27

Examples 1 to 9 have been repeated, except that a mixture containing 50% amino propyl triethoxy silane, and 50% by weight amino propyl trimethoxy silane, has been used as amino silane.

EXAMPLES 28 to 36

Examples 1 to 9 have been repeated, except that glass particles (substantially spherical) with a particle size of about 10 $\mu$m were added to the aminosilane solution containing carbon black aggregates, the amount of glass particles in said solution corresponding to about 5% by weight.

EXAMPLES 37 to 45

Examples 1 to 9 have been repeated, except that glass particles (substantially spherical) with a particle size of about 10 $\mu$m were added to the aminosilane solution containing carbon black aggregates, the amount of glass particles in said solution corresponding to about 5% by weight. Said glass particles being provided with an electrical conductive coating (silver coating).

It is clear that said examples are limiting the scope of the invention, and that many modifications are possible.

For example, the curing can be made at room temperature or at temperature just below the degradation of one compound of the resin (polysiloxane) layer. Curing at low temperature requires a longer curing time, whereby the curing is preferably made at temperature higher than 100° C., such as temperature of 110° C., 120° C., 130° C., 150° C., 180° C., etc.

Other solvents than ethanol can be used, such as methanol, mixture ethanol/methanol, isopropanol, xylene, toluene, ethyl ether, etc.

The coating of the roller can be made by any adequate methods, such as dipping, painting, brushing, spraying, swap coating, etc.

The solid concentration of the solution used for the coating can be adapted in function of the type of printer or fax or copier, the type of toner, the type of coating applications, the required viscosity, the curing time, the desired thickness of the coating, the presence of other additives or fillers present in the composition. The amount of carbon black aggregates in the resin solution can be adapted so as to obtain a surface which is electrically conductive or which has an electrical resistance, for example a resistance from 0.1 Ω.cm up to $10^{15}$ Ω.cm, such as a conductive surface (such as surface with resistance lower than $10^{2}$ Ω.cm), a resistive surface (such as surface with a resistance higher than $10^{12}$ Ω.cm) and semi resistive surface.

I claim:

1. Roller for a printer, fax machine or copier, said roller being intended to be in contact with toner particles, said roller being provided with at least one carbon black containing resin layer, said resin layer being cured and having a thickness of less than 200 $\mu$m, in which the carbon black has the form of aggregates of carbon black particles, said aggregates having a weight average size lower than 30 $\mu$m, a DBP absorption of more than 110 ml/100 g and a BET-surface area greater than 250 $m^2$/g, in which the carbon black aggregates are precoated with a precoating comprising an amino silane compound so as to form precoated carbon black aggregates, and in which the precoated carbon black aggregates are substantially homogeneously dispersed in the resin, whereby the resin layer comprises more than 50% by weight of said precoated carbon black aggregates.

2. The roller of claim 1, in which the resin layer comprises at least one curable resin and has a thickness of less than 100 $\mu$m.

3. The roller of claim 1, in which the resin layer is a layer made of a resin selected from the group consisting of polyurethane, natural rubber, butyl rubber, nitrile rubber, polyisoprene rubber, polybutadiene rubber, silicone rubber, styrene butadiene rubber, acryl rubber, polysiloxane, epoxy and mixtures thereof.

4. The roller of claim 1, in which the resin layer comprises at least one curable polysiloxane.

5. The roller of claim 1, in which the resin layer is a cured polysiloxane layer.

6. The roller of claim 1, in which the weight ratio amino silane/carbon black aggregate for the precoated carbon black aggregates is comprised between 0.05 and 0.95.

7. The roller of claim 1, in which the weight ratio amino silane/carbon black aggregate for the precoated carbon black aggregates is about 0.5.

8. The roller of claim 1, in which the amino silane is an amino silane in which the silicon atom is bound to three groups selected from the group consisting of methoxy, ethoxy, propoxy and butoxy.

9. The roller of claim 1, in which the amino silane is selected from the group consisting of amino (C2–C12 alkyl) trimethoxysilane, amino (C2–C12 alkyl) triethoxysilane and their mixtures.

10. The roller of claim 1, in which the amino silane is selected from the group consisting of amino (C3–C6 alkyl) trimethoxysilane, amino (C3–C6 alkyl) triethoxysilane and their mixtures.

11. The roller of claim 1, in which the amino silane is selected from the group consisting of amino propyl trimethoxysilane, amino propyl triethoxysilane and their mixtures.

12. The roller of claim 1, in which the cured resin layer comprises from 50 to 99% by weight of carbon black aggregates coated with an aminosilane.

13. The roller of claim 1, in which the cured resin layer is a cured polysiloxane layer, the polysiloxane being selected from the group consisting of methyl polysiloxane, methyl phenyl polysiloxane, phenyl polysiloxane and their mixtures.

14. The roller of claim 1, in which said carbon black containing cured resin layer overcoats a layer selected from the group consisting of aluminum containing layer, carbon black containing layer, polyurethane containing layer, silicon containing layer, epoxy containing layer and graphite containing layer.

15. The roller of claim 1, in which the carbon black containing cured resin layer further comprises substantially spherical beads with a weight average particle size lower than 50 $\mu$m.

16. The roller of claim 1, in which the carbon black containing cured resin layer further comprises substantially spherical beads provided with an electrical conductive layer.

17. The roller of claim 1, in which the carbon black containing cured resin layer is overcoated with at least one further layer.

18. The roller of claim 1, said roller being selected among the group consisting of developing rollers, magnetic rollers and primary charge rollers.

19. The roller of claim 1, in which the carbon black containing cured resin layer containing carbon black aggregates is the layer intended to be in contact with toner particles.

20. The roller of claim 1, in which the weight ratio amino silane/carbon black aggregate for the precoated carbon black aggregates is comprised between 0.2 and 0.8.

* * * * *